US012686085B1

(12) United States Patent
Rieck

(10) Patent No.: US 12,686,085 B1
(45) Date of Patent: Jul. 21, 2026

(54) SYSTEM AND METHOD FOR REPAIR OF BREACH IN EXTERIOR SECONDARY CONTAINMENT WALL OF DOUBLE WALL UNDERGROUND STORAGE TANK WITHOUT EXCAVATION

(71) Applicant: Poly Lining Systems, Inc., Plymouth, NH (US)

(72) Inventor: Anthony James Rieck, Colorado Springs, CO (US)

(73) Assignee: Poly Lining Systems, Inc., Plymouth, NH (US)

(*) Notice: Subject to any disclaimer, the term of this patent is extended or adjusted under 35 U.S.C. 154(b) by 0 days.

(21) Appl. No.: 19/369,617

(22) Filed: Oct. 27, 2025

Related U.S. Application Data

(60) Provisional application No. 63/833,146, filed on Oct. 29, 2024.

(51) Int. Cl.
　　*B23P 6/04*　　　(2006.01)
　　*B65D 88/76*　　　(2006.01)
　　*B65D 90/02*　　　(2019.01)

(52) U.S. Cl.
　　CPC ............... *B23P 6/04* (2013.01); *B65D 88/76* (2013.01); *B65D 90/028* (2013.01); *B65D 2590/0075* (2013.01)

(58) Field of Classification Search
　　CPC ...... B65D 88/06; B65D 88/76; B65D 90/028; F16L 9/18; F16L 55/164; B23P 6/00; B23P 6/04; Y10T 29/49718; Y10T 29/49746
　　See application file for complete search history.

(56) References Cited

U.S. PATENT DOCUMENTS

| 2,817,218 A | * | 12/1957 | Beckwith | .............. | F16L 55/164 |
| | | | | | 29/402.18 |
| 10,844,990 B1 | * | 11/2020 | Francis | ............... | F16L 55/1686 |
| 2003/0056370 A1 | * | 3/2003 | Wild | ...................... | F16L 55/164 |
| | | | | | 29/402.09 |

FOREIGN PATENT DOCUMENTS

CN　　　　　114013853 A　*　2/2022　............... B23P 6/00

* cited by examiner

*Primary Examiner* — Matthew P Travers
(74) *Attorney, Agent, or Firm* — Loginov & Associates, PLLC; William A. Loginov

(57) ABSTRACT

This invention provides a system and method for the repair of breaches in an exterior secondary containment wall of double wall underground storage tank, including accessing an interstitial space between the exterior secondary containment wall and an inner primary containment wall with a fluid source input assembly. A flowable material is then injected through the fluid source input assembly so that it substantially fills the interstitial space of the tank and solidifies, forming a substantially impermeable barrier to movement of material through the exterior secondary containment wall and an exterior environment. The inner primary containment tank is made of metal or a fibrous resinous material and/or the exterior secondary containment wall is made of metal, a fibrous resinous material, or a polymer material. An injection port is provided, defining a passage through the inner primary wall for the injection of the flowable material into the interstitial space.

14 Claims, 7 Drawing Sheets

SYSTEM AND METHOD FOR REPAIR OF BREACH IN EXTERIOR SECONDARY CONTAINMENT WALL OF DOUBLE WALL UNDERGROUND STORAGE TANK WITHOUT EXCAVATION

RELATED APPLICATIONS

This application claims the benefit of U.S. Provisional Application Ser. No. 63/833,146, entitled METHOD FOR REPAIR OF BREACH IN EXTERIOR SECONDARY CONTAINMENT WALL OF DOUBLE WALL UNDERGROUND STORAGE TANK WITH INTEGRAL, IMPERMEABLE SECONDARY CONTAINMENT WITHOUT EXCAVATION, filed Oct. 29, 2024, the entire disclosure of which is herein incorporated by reference.

FIELD OF THE INVENTION

This invention relates to underground storage tanks, and more particularly to systems and methods for repairing leaking exterior containment walls in double wall tanks in situ.

BACKGROUND OF THE INVENTION

Underground storage tanks (USTs) are widely used for the bulk storing of a great variety of liquids. Some of these liquids are corrosive, flammable or combustible, and/or harmful to the environment. There is a recognized need for such tanks to be free of defects which could allow the primary storage wall to degrade through corrosion causing a leak of the stored liquid. Additionally, many state regulations require underground storage tanks to have a reliable secondary containment means which is capable of being monitored to detect leaks from either the exterior secondary tank wall or the inner primary tank wall. A breach of either the inner primary wall or the outer secondary wall prevents detection of a leak before it reaches the environment.

As there exist no other currently available methods for accurately determining the location of a breach in the exterior secondary containment wall and accessing the breach to perform a repair, underground storage tanks with exterior secondary containment breaches are either required to be removed or abandoned in place. Removal and replacement of an underground storage tank is costly. Additionally, the removal of a single underground storage tank adjacent to another underground storage tank can cause the compacted backfill around the adjacent tank to move, rendering the backfill incapable of properly supporting the adjacent tank. By way of non-limiting example, as shown in FIG. 1, a typical arrangement/site of three tanks 100 at a spacing ST of (e.g.) approximately 2 feet is shown. Where a tank in this arrangement exhibits a leak, abandonment in place may be the only viable option. Abandonment in place is both costly and it reduces both the volume of storage at a site and the number of products that can be stored at the site.

FIG. 1A shows a typical double wall underground storage tank 100 according to a prior art arrangement. This exemplary tank can be buried (e.g.) at a depth DB below the surface/pavement S of approximately 3-4 feet, but this burial depth is highly variable depending upon climate, soil conditions, etc. The tank 100 includes an inner primary wall 120 for containing liquid within the interior and an exterior secondary wall 122, with an interstitial space 124 between the two walls 120 and 122 that can be monitored for releases from either the exterior secondary tank wall 122 or the inner primary tank wall 120. The interstitial space 124 is also referred to as an "annular space". This interstitial space 124 is continually monitored and periodically tested to ensure the integrity of both the exterior secondary wall 122 and the inner primary wall 120. The tank 100 can include various conventional components, including, but not limited to, a fill tube 130 extending from the surface S to the tank interior/volume; atop-mounted access manway 132, which is typically sized for manned entry into a tank, in addition to equipment access (being typically 16"-24", or more, in diameter; a dispensing line 134 routed from the tank interior to an appropriate dispensing site or apparatus (e.g. a fuel pump, engine, boiler, etc.—not shown); a dispensing pump 136 that is appropriately submerged in the tank interior in connection with the dispensing line 134; and an automatic tank level gauge assembly 138 that transmits the current fluid level to an indicator (not shown). The top of the tank 100 can also include a vent pipe 139 that passes through the two walls 120, 122, and into the tank interior. Such components can be arranged in a variety of manners in accordance with industry practice and/or the tank's size/application.

Interstitial space monitoring methods include (a) the use of wet/dry detection probes in an interstitial monitoring tube 140, which can extend downwardly from the surface S through the internal tank space/volume as shown, or be mounted along a tank end cap 150; (b) placing a vacuum on the interstitial space; and (c) filling the interstitial space with a brine or similar solution and attaching a reservoir to the interstitial access port (not shown) which can be observed for changes in liquid level at the top of the tank via a top-mounted port, communicating with the interwall, interstitial space 124. All three conventional methods (a)-(c) can be used to detect wall leaks in two different interstitial space access configurations.

The first method, also termed "Method A" herein, is shown further in FIG. 2A, relative to Tank 100 (FIG. 1). This tank 100 employs the above-described interstitial monitoring tube 140 that extends from the top of the tank through the interior tank, or along the end cap 150 (FIG. 1) of the tank, to the bottom of the tank where it penetrates the inner primary wall 120 and accesses the interstitial space 124 at or near the lowest point of the tank. The tube 140 allows a probe 210 to be placed at the lowest point of the tank 100, to sense whether any fluid has collected at this location or is passing through this location in the interstitial space 214. It is tethered to a wire or cable 220 that extends out of the top end of the tube 140, and can be interconnected with an appropriate sensing device/module (not shown).

The second method, also termed "Method B" herein, is shown in FIG. 2B, relative to a tank 250 having a tank top port 260 that accesses the interstitial space, residing at the top of the tank. This tank is relatively similar in construction and components to the tank 100 in FIG. 1, except for the use of a top port 260, and defines an inner wall 270, outer wall 272, and interstitial space therebetween 274. The top port 260 provides an opening into the interstitial space that provides a pathway allowing allow the probe 210 to follow the wall(s) 270, 272 to the lowest point of the tank 250. The tether or cable 220 is, again, long enough to extend out of the port 260 so as to connect with a sensing device/module.

Alternatively, the interstitial space can be filled, via the tube 140 or top port 260, with brine/environmentally neutral fluid and the level can be monitored for leaks. Similarly, a vacuum can be applied to the tube 140 or top port 260 and monitored for fluctuation.

Double wall underground storage tanks are manufactured in a variety of ways. Tanks are typically fabricated (a) using two steel walls with an external coating to prevent corrosion; (b) from two layers of fiberglass laminate; (c) from steel tanks with an outer fiberglass laminate wall; (d) from steel tanks with a fiberglass exterior secondary containment wall; and (e) from steel tanks with a flexible exterior secondary containment membrane. Both the inner primary wall and the exterior secondary wall of the double wall tank can be self-structural, or the two walls can be co-structural relying upon the combined structure of both the inner primary wall and the exterior secondary wall to maintain the overall structural integrity of the tank. Most methods of double wall underground tank manufacture provide an exterior secondary containment wall that fully encapsulates the inner primary wall creating a 360-degree interstitial space that can monitor for releases over all portions of the tank. A few methods of double wall tank manufacture provide an exterior secondary containment wall that covers 320 degrees of the inner primary tank wall, but does not form an interstitial space over the very top portion of the underground storage tank's inner primary wall.

It is generally desirable to provide a system and method that allows the option of repairing a leak when detected in one of the walls, wherein the tank can remain in place and can be returned to service where such is allowable.

SUMMARY OF THE INVENTION

This invention overcomes a method whereby a breach in the exterior secondary containment wall of an underground storage tank (UST) can be repaired without excavation in a convenient, yet economical manner. Further, this method preserves both the structural properties of the existing exterior secondary containment wall and the inner primary wall into a singular wall with the combined structure of both tank walls and forming a viable single wall tank. Where allowed by regulations, the single wall tank can be placed in service. Where secondary containment is either required or desired, an in-situ formed retrofit secondary containment inner tank can be applied to the tank interior restoring the interstitial leak monitoring capability. A method, and associated system, for sealing breaches in the exterior secondary containment wall of a double wall underground storage tank comprises the steps of (a) cleaning the tank interior to make it safe for hot work, (b) installing one or more injection ports through the inner primary wall of the underground storage tank, (c) providing a relief port(s) at the highest point of the interstitial space on Method A interstitial access configurations, (d) for Method A interstitial access configurations the interstitial monitoring tube is sealed at the tank bottom, (e) attaching a mixing chamber to the injection port, if required (f) attaching the hose(s) between injection port and the liquid interstitial fill liquid tank(s) and pump(s), (g) pumping the liquid interstitial fill liquid into the interstice until the liquid begins to emerge from the relief port(s) or the Method B interstitial access port, (h) close the valve(s) on the injection port(s), and (i) close the relief port(s). The emergence of the interstitial fill liquid through the Method B interstitial access port or the relief port(s) for Method A interstitial access configurations indicate that the interstice has been completely filled with the interstitial fill liquid. The interstitial fill liquid sets and becomes solid. The injection port is removed and the penetration of the inner primary tank wall is repaired using fibrous reinforced resinous material.

In an illustrative embodiment, a method for the repair of breaches in the exterior secondary containment wall of double wall underground storage tank includes accessing an interstitial space between the exterior secondary containment wall and an inner primary containment wall with a fluid source input assembly. A flowable material is then injected through the fluid source input assembly so that it substantially fills the interstitial space of the tank and solidifies to form an impermeable barrier to the movement of material through the exterior secondary containment wall and an exterior environment. Illustratively, the inner primary containment tank is made of metal or a fibrous resinous material and/or the exterior secondary containment wall is made of metal, a fibrous resinous material, or a polymer material. Accessing the interstitial space, and injecting the flowable material, can include providing an injection port that defines a passage through the inner primary wall for the injection of the flowable material into the interstitial space. The exterior secondary containment wall can define a 360-degree secondary containment wall. A relief port can be applied adjacent to a top of the exterior secondary containment wall to vent the flowable material so as to substantially fully fill the interstitial space. Alternatively, the exterior secondary containment wall can define a 320-degree secondary containment wall. Relief ports can be applied adjacent to locations at a top of the interstitial space, on the exterior secondary containment wall, to vent the flowable material so as to substantially fully fill the interstitial space. The exterior secondary containment wall can be made of metal, a fibrous resinous material, or a polymer material. The accessing of the interstitial space, and injecting of the flowable material, can include providing an injection port that defines a passage through the inner primary wall for the injection of the flowable material into the interstitial space. A first component of the flowable material can be directed from a first source along a first hose, and a second component of the flowable material can be directed from a second source along a second hose, both flowing into an interior volume of the underground storage tank to a mixer that is coupled to the injection port The injection port can be provided to the tank by drilling a hole in the inner primary containment wall, and sealably securing a flanged threaded coupling nut into the hole. This flanged threaded coupling can be connected to the mixer. The first component can consist of Acrylamide Grout Mix and the second component can consist of Acrylamide Activation Mix. The exterior secondary containment wall can define a 360-degree secondary containment wall, and further comprising, applying a relief port adjacent to a top of the exterior secondary containment wall to vent the flowable material so as to substantially fully fill the interstitial space. Where the exterior secondary containment wall defines a 320-degree secondary containment wall, relief ports are applied adjacent to locations at a top of the interstitial space, on the exterior secondary containment wall, to vent the flowable material so as to substantially fully fill the interstitial space. A system that performs the above-described method can be provided. A first component of the flowable material in a first source, connected to a first hose, and a second component of the flowable material, connected to a second hose, are provided. The first hose and the second hose extend into an interior volume of the underground storage tank to a mixer that is coupled to the injection port. The first component can be Acrylamide Grout Mix and the second component can be Acrylamide Activation Mix. The exterior secondary containment can wall define a 360-degree secondary containment wall, and further comprising, a relief port adjacent to a top of the exterior secondary containment wall to vent the flowable material so as to substantially fully fill the interstitial space. The underground storage tank can include an interstitial monitoring tube that extends downwardly from an exterior of the underground storage tank to a bottom of the inner primary containment wall. An opening through the inner primary containment wall can include an added seal adjacent to the interstitial space to prevent the flowable material from rising therethrough from the interstitial space. The interstitial monitoring tube can include, adjacent the inner primary containment wall and above the added seal, one or more slots that access the interior volume. The slots can be located to communicate with a new interstitial space between the inner primary containment wall, and a retrofit inner containment wall.

In an illustrative embodiment, a system for the repair of breaches in the exterior secondary containment wall of double wall underground storage tank is provided. At least one injection port and one relief port communicate with an interstitial space between the exterior secondary containment wall and an inner primary containment wall with a fluid source input assembly. The (at least one) injection port is located at the inner primary containment wall and the (at least one) relief port is located adjacent to a top of the interstitial space on the exterior secondary containment wall. A flowable material is injected into the injection port that substantially fills the interstitial space of the tank and solidifies to form an impermeable barrier to the movement of material through the exterior secondary containment wall and an exterior environment. Illustratively, the injection port is interconnected with a mixer that receives each of two components from two sources, respectively, that harden after the two components mix.

BRIEF DESCRIPTION OF THE DRAWINGS

The invention description below refers to the accompanying drawings, of which:

FIGS. 1B, 2A, 3A and 4) with liquid fill components to created a seal between inner and outer walls that eliminates leaks.

DETAILED DESCRIPTION

While the description to follow describes the system and method described herein in terms of its use with underground storage tanks (USTs), it should be understood the invention has applicability for other uses as well. However, the system and method is desirably applicable to underground storage tanks used for storing liquid fuel/gasoline.

By way of further background, underground storage tanks are well known and are widely used, especially in the gasoline service station industry. Double walled underground storage tanks have become the preferred configuration of underground storage due to the many regulations requiring their use in particular situations and the ability to monitor the underground storage tanks to detect releases before the stored material enters the environment and potentially causes undesirable and costly damage to the environment. Double wall underground storage tanks have both an inner primary storage wall which is in direct contact with the stored liquid and an exterior secondary containment wall intended in part to contain releases and hold them so that they can be detected and removed prior to reaching the environment. Exterior secondary containment walls can also provide protection of the inner primary wall from contact with environmental elements which could cause degradation or corrosion of the inner primary tank wall and eventually result in failure of the inner primary tank wall to fully contain the liquid stored within it.

Figure 1A:
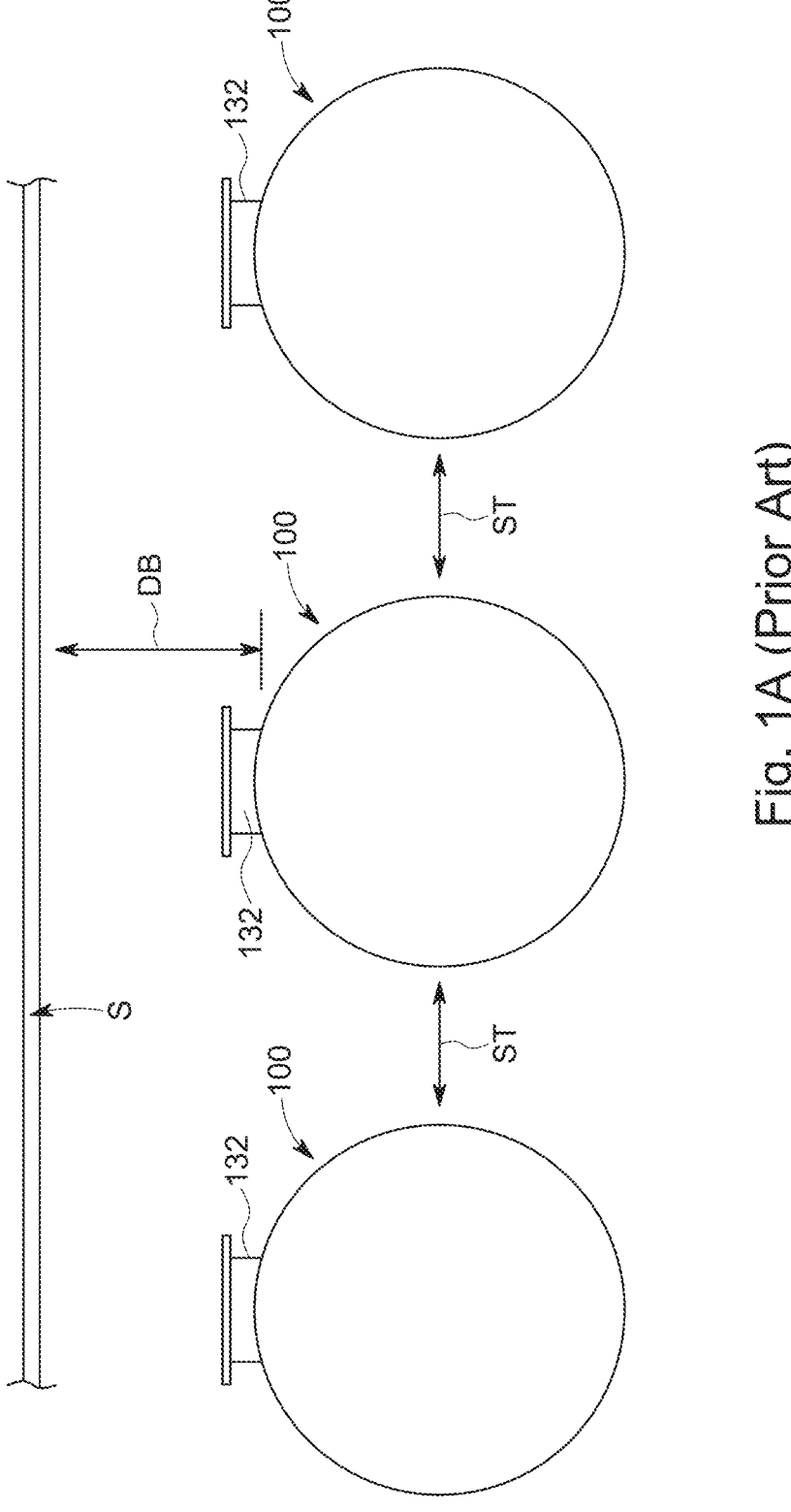
FIG. 1A, already described, is an end view of an underground storage tank installation such as might be found at a gasoline service station with typical burial depth and tank separation distances.
Figure 1B:
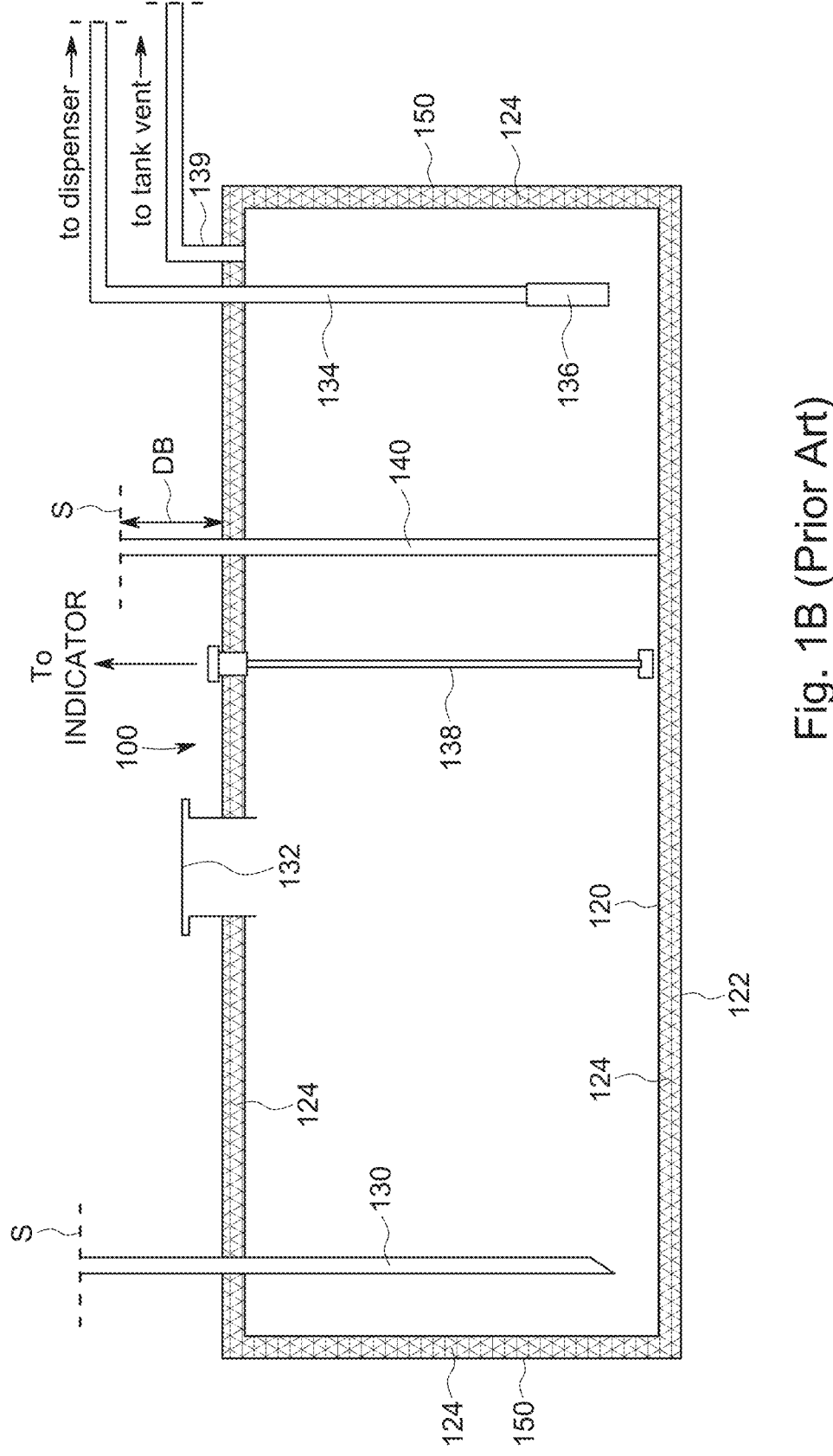
FIG. 1B, already described, is a side view cross-section of a typical double wall underground storage tank, such as provided in the installation of FIG. 1A.

Referring to the exemplary tank of FIG. 1B, inner primary underground storage tank walls (120) are typically made of metal or a fibrous reinforced resinous material. Normally, the inner primary tank wall 120, when made of sheet metal (e.g. steel), is from approximately 0.125 inches to about 0.75 inches thick, while the inner primary tank wall, when made of a fibrous reinforced resin-based material (e.g. fiberglass) with ribs, is from approximately 0.125 inches to about 0.40 inches thick. The inner primary wall is normally self-supportive, that is, capable of withstanding external load forces associated with burial, water table levels and traffic loads. Thus, the inner primary tank wall thickness is dependent on the tank's size and, of course, should be able to withstand the aforementioned load forces.

Figures 3A, 3B:
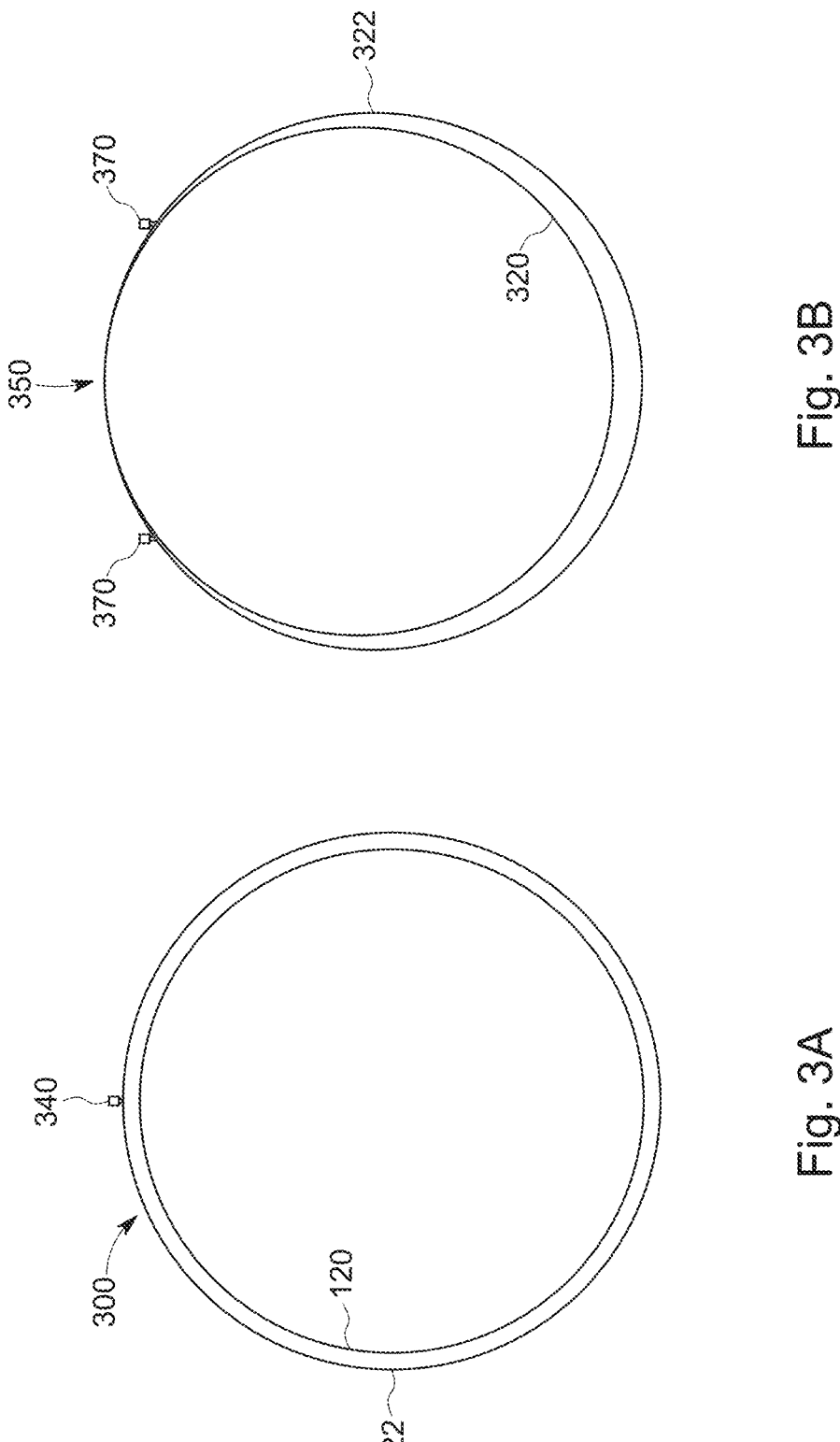
FIGS. 3A and 3B is an end view showing the locations for relief ports on 360-degree and 320-degree double wall underground storage tanks, respectively, for use with the system and method herein.

Exterior secondary containment walls (122) of underground storage tanks can be either self-structural, or co-structural, relying upon the structure and strength of the inner primary wall to withstanding external load forces associated with burial, water table levels and traffic loads. Exterior secondary containment walls 122 are typically made of metal with a coating to prevent corrosion, a fibrous reinforced resin-based material, or a thick polymer material (e.g. high-density polyethylene HDPE, and similar materials). As shown by way of example in FIG. 3A, the tank's (300) exterior secondary containment wall 122 can fully encapsulate the inner primary tank wall 120 forming a 360-degree double wall containment structure. Alternatively, as shown in the tank 350 of FIG. 3B, the exterior wall 322 can provide a secondary containment barrier around the entirety of the bottom-biased portion of the inner primary tank wall 320 designed to store liquid product, and can referred to as 320-degree double wall tank.

Figure 2B:
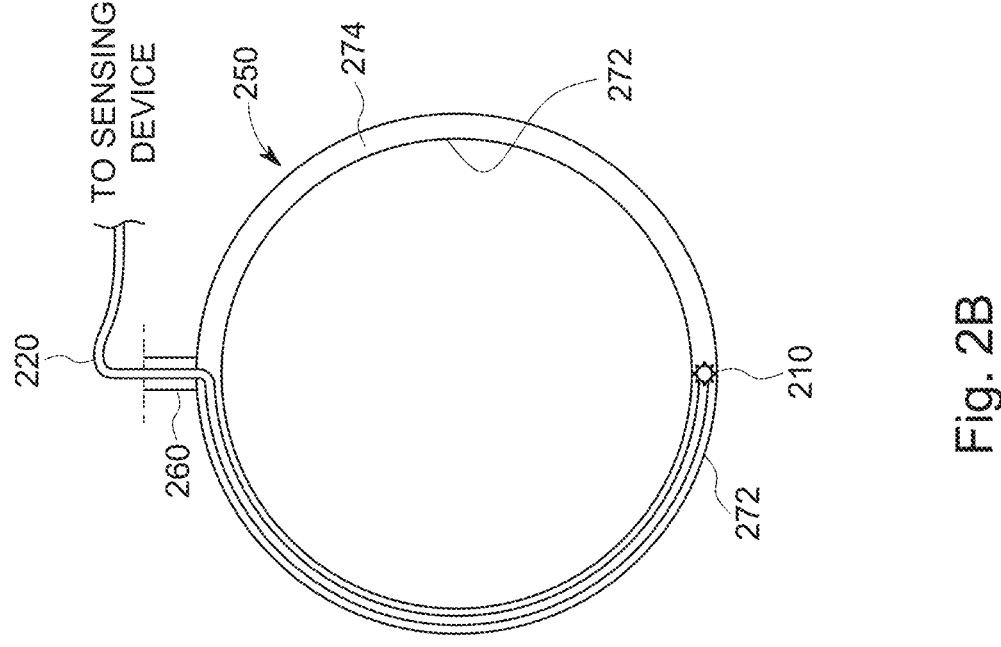
FIG. 2B is an exposed end view of an underground storage tank, having a top port, employing leak detection Method B by way of example.
Figure 2A:
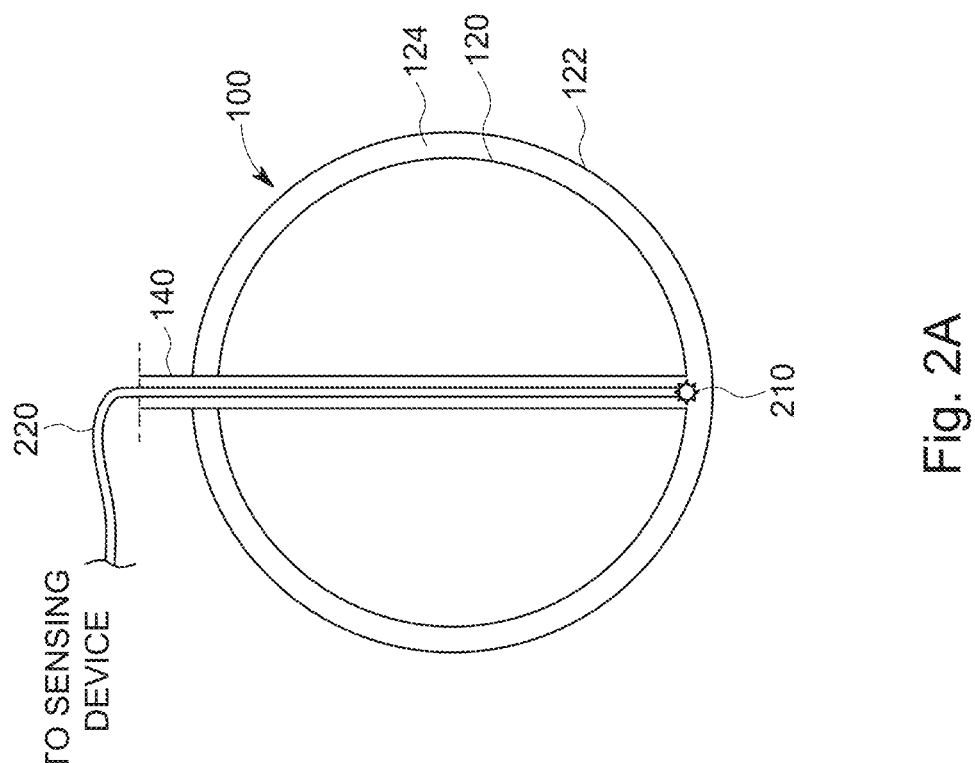
FIG. 2A is an end view of an underground storage tank as shown in FIG. 1B, employing leak detection Method A by way of example.

The space formed between the inner primary tank wall and the exterior secondary containment tank wall is called an interstice or annulus. The interstice or annulus can be formed either through the natural formation of a space such as when a plate of steel is placed over another plate of steel, or by placing a porous material (e.g. fiber mesh, corrugated cardboard, aluminum foil, etc.) between the inner primary tank wall and the exterior secondary containment tank wall. The interstice must be continuous over the entirety of the secondarily contained portion of the inner primary tank wall, that is, liquid introduced to any part of the interstice must be capable of flowing to and being detected at the monitoring location. As described above, there are three recognized methods for monitoring the interstice to detect leaks: wet/dry probes, vacuum monitoring, and liquid pressure monitoring. Typical interstice access configurations are shown in FIGS. 2A and 2B.

When a leak occurs in a double wall underground storage tank, the determination should be made as to whether the breach exists in the inner primary tank wall or in the exterior secondary tank wall if the tank is to be repaired. Breaches of the inner primary tank wall can be readily located by entering and inspecting the tank allowing for any necessary repair to be made. When a breach occurs in the exterior secondary containment wall of the underground storage tank, there is no clear indication of the location of the leak. According to prior art solutions, excavation to the location of the breach is generally the only viable option. However, locating the leak so that it can be repaired is extremely difficult and costly due to need to excavate gravel, asphalt or concrete pavement covering the tanks, which, as noted above, are buried three or more feet under the surface, and because the leaking tank is often adjacent to other tanks or structures in near proximity as depicted in FIG. 1A.

As shown in FIG. 1B, a typical double wall underground storage tank 100 which serves as a part of the storage tank installation (FIG. 1A), and can define a generally cylindrical shape with side walls 122 and end caps 150. Sufficient openings are found in the storage tank (typically along the top) to allow for various equipment to communicate with the interior of the tank. A fill tube 130, dispensing pump 136 and line 134, automatic tank gauge 138 and a vent pipe 139 are conventional in nature and serve their known functions.

Figure 4:
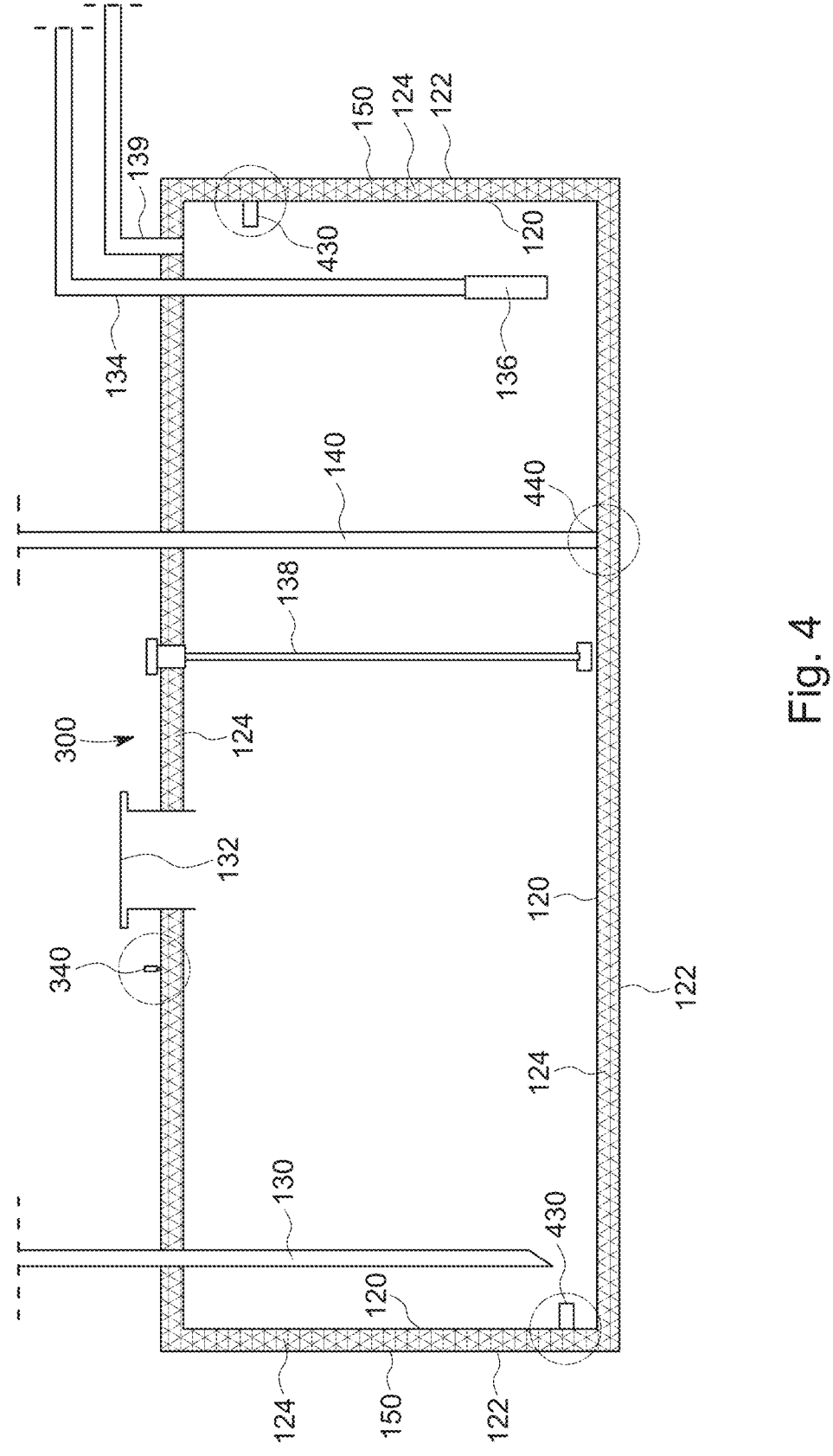
FIG. 4 is a side view cross-section showing the locations for the interstitial liquid fill components for use with the system and method herein relative to the tank of FIGS. 1B, 2A, 3A and 3B.

In accordance with an illustrative embodiment herein, a minimum of one interstice access port/tube 140 is installed through the inner primary tank wall 120 as shown in FIG. 4 to access the interstice 124 via a passthrough 440 in the inner wall 120. A series of injection ports 430 are provided (on the interiors of opposing end walls 150 in this example) in accordance with the system and method herein for additional access to the interstice 124. The number and placement of injection ports 430 is based on the calculated volume of the interstitial space. The injection ports 430 and their mode of installation are described in detail below.

After the tank is drained, a hole sized to a flanged threaded coupling nut is drilled through the inner primary tank wall 120 at each location where an interstice injection port 430 is specified. With further reference to an exemplary injection port 430 in FIG. 5, a conventional flanged threaded coupling nut 510 is inserted into the created hole so that the flange is on the interior side (within the interstice 124) of the inner primary tank wall 120 and the flange has sufficient room between the inserted end of the flange and the exterior secondary containment tank wall 122 to allow the flow of an interstitial filling liquid into the interstice 124. In an illustrative embodiment, sealant (e.g. silicone, urethane, etc.) is applied around the flange of the flanged threaded coupling nut to seal the nut in place, and this sealant is allowed to set prior to use.

Figures 5, 6:
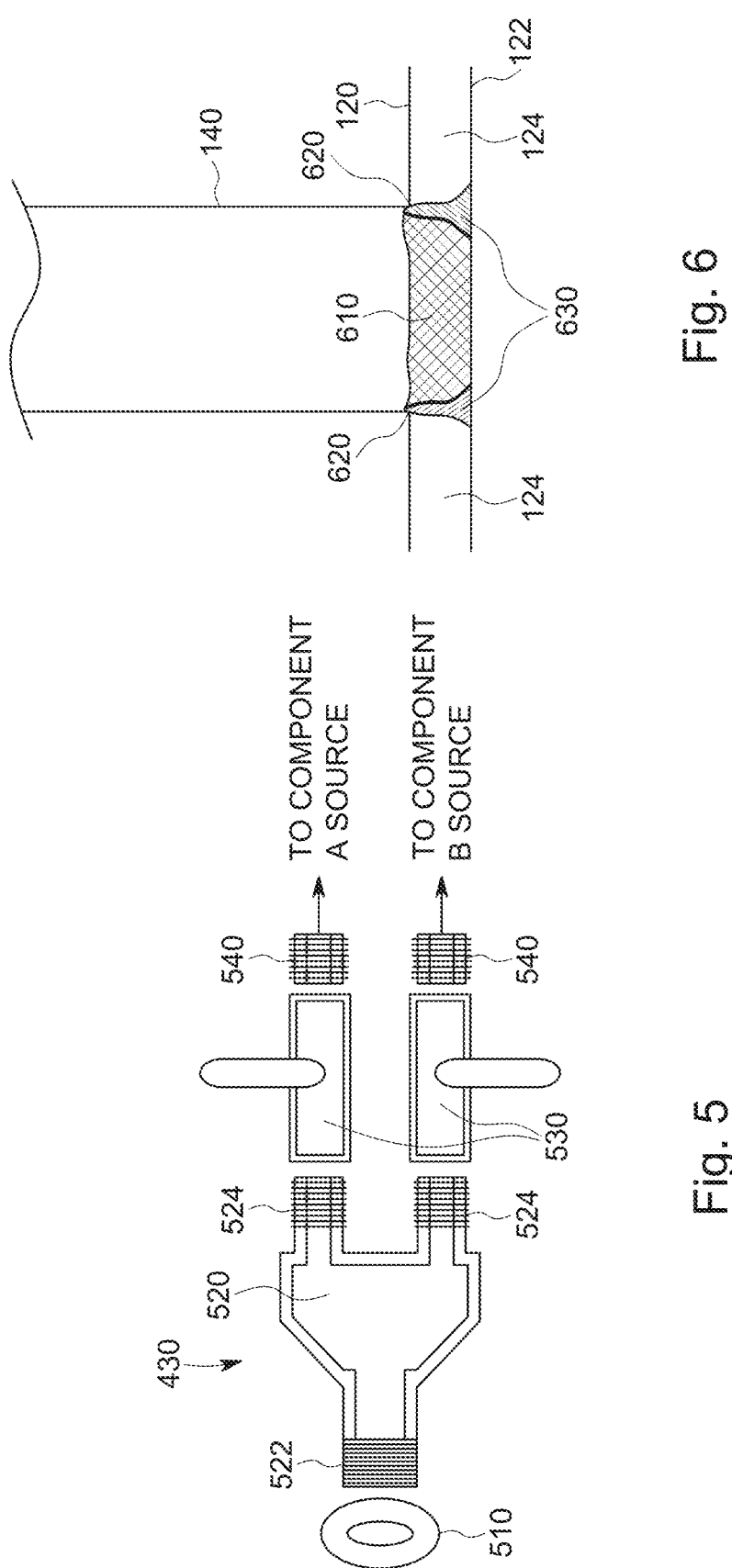
FIG. 5 is an exploded side view of an injection port assembly with associated mixer and ball valves for use with the system and method herein.
FIG. 6 is a cut away fragmentary side view of a sealed monitoring tube used in Method A leak detection in the tank of FIGS. 1B, 2A, 3A and 4.

As shown in FIG. 5, the injection port 430 can include a mixing chamber 520 with a single threaded outlet 522 sized to the flanged threaded coupling nut 510, and having (e.g.) two (e.g. threaded) inlet ports 524, is inserted into the flanged threaded coupling nut 510 at each interstice injection port location (FIG. 4). Two threaded ball valve assemblies 530 are attached (e.g. threaded onto) to each mixing chamber inlet 524 such that the discharge end of the threaded ball valve assemblies 530 are attached to the mixing chamber 520. A close (e.g. threaded) nipple 540 is installed into each of the ball valve assemblies 530 on the inlet side to provide a connection to Component A and Component B liquids as described further below. The mixing chamber 520 provides a Y-connection that merges the two liquids under flow pressure during injection into the interstice 124. It can include a geometry that enhances mixing in alternate embodiments (e.g. veins, spirals, etc.), or can rely upon straight mixing of the Components.

Where the interstitial access port 140 of the double wall underground storage tank 300 (renumbered as modified in FIG. 3A, and wherein similar components to tank 100 are similarly numbered) is configured for Method A leak detection, as depicted in FIGS. 1B, 2A and 4, a relief port 340 (FIGS. 3A and 4), or dual relief ports 370 (FIG. 3B) are be provided as at, or adjacent to the top of the tank/interstice. These allow pressure from the infill of the interstice 124 of Components A and B to be vented to the ambient outside environment. Filling typically occurs from the tank bottom-up to a predetermined level in a manner that is free of bubbles and voids, as described further below.

To avoid backflow, the interstitial monitoring tube 140 is sealed before filling with the liquid components at its junction with the interstice 124 as shown in FIG. 6. An appropriate, fuel resistant (typically viscous) liquid resin (e.g. epoxy, polyester, etc.) can be used to form a plug 610 at the junction with the inner wall 120. Slots 620 can be formed in the tube 140 inboard of the inner wall to allow for communication with the tank contents to provide communication with a subsequently applied interior (retrofit) primary containment wall (within, and spaced from, the inner wall 120, so as to form a new interstitial space), so that the same monitoring tube 140 can be used. In the more-rare instance that the repaired tank is returned to service as a single wall tank, the slots 620 (and the monitoring tube 140) are unnecessary. A fillet of putty 630 is provided around the junction hole within the interstice 124 to retain the resin 610 in place during curing in this arrangement. Such a putty can be formed using epoxy or polyester resin, thickened in accordance with conventional techniques to from a mastic. Note that, in alternate embodiments, preformed plugs, etc. can be employed instead of, or in addition to, resin/sealants. More generally, any cured material that is in contact with the contents of the tank (e.g. gasoline) should be able to resist chemical attack thereby.

Note also that no relief port or sealing of the interstitial monitoring tube is required for double wall underground storage tanks with an interstitial access port configured for Method B leak detection as depicted in FIG. 2B. This is because pressure from the infill of Components A and B into the interstice in this arrangement can be vented outwardly into the ambient air through the port 260. In general, the fill can be (but is not limited to) a two-part resin system adapted to the task, such as Acrylamide grout.

By way of non-limiting example Component A can comprise commercially available Acrylamide Grout Mix and Component B can comprise a system-specific Acrylamide Activator Mix. The components can be provided to the port at a pressure in a range that generates an approximate flow rate of approximately 10 to 20 gallons per minute (GPM). It is expressly contemplated that other compounds can be employed in accordance with skill in the art, and these compounds are meant to be exemplary of a range of compounds, both organic and inorganic, that form a continuous matrix of material between thin walls free of porosity, and capable of withstanding chemical reaction and/or dissolution by solvents, such as gasoline and similar petroleum products.

In accordance with the system and method herein, once the injection port(s) 430 and relief port(s) 340 or 370 have been prepared mixing and injection of the two-part interstitial fill liquid occurs by having the Component A solution and the Component B solution mix in the mixing chamber 520 immediately prior to injection into the interstice. When Component A and Component B are mixed together, the combined solution begins to react chemically, and the mixed Components A and B solidify. The rate of solidification is governed by the dilution of the two components in a controlled range of 3 to 10 minutes following the mixing of the component parts. The solidification rate is chosen based upon the volume of the interstitial space to be filled with larger volume interstitial spaces requiring slightly longer solidification times than smaller volume interstitial spaces.

Figures 7A, 7B, 7C:
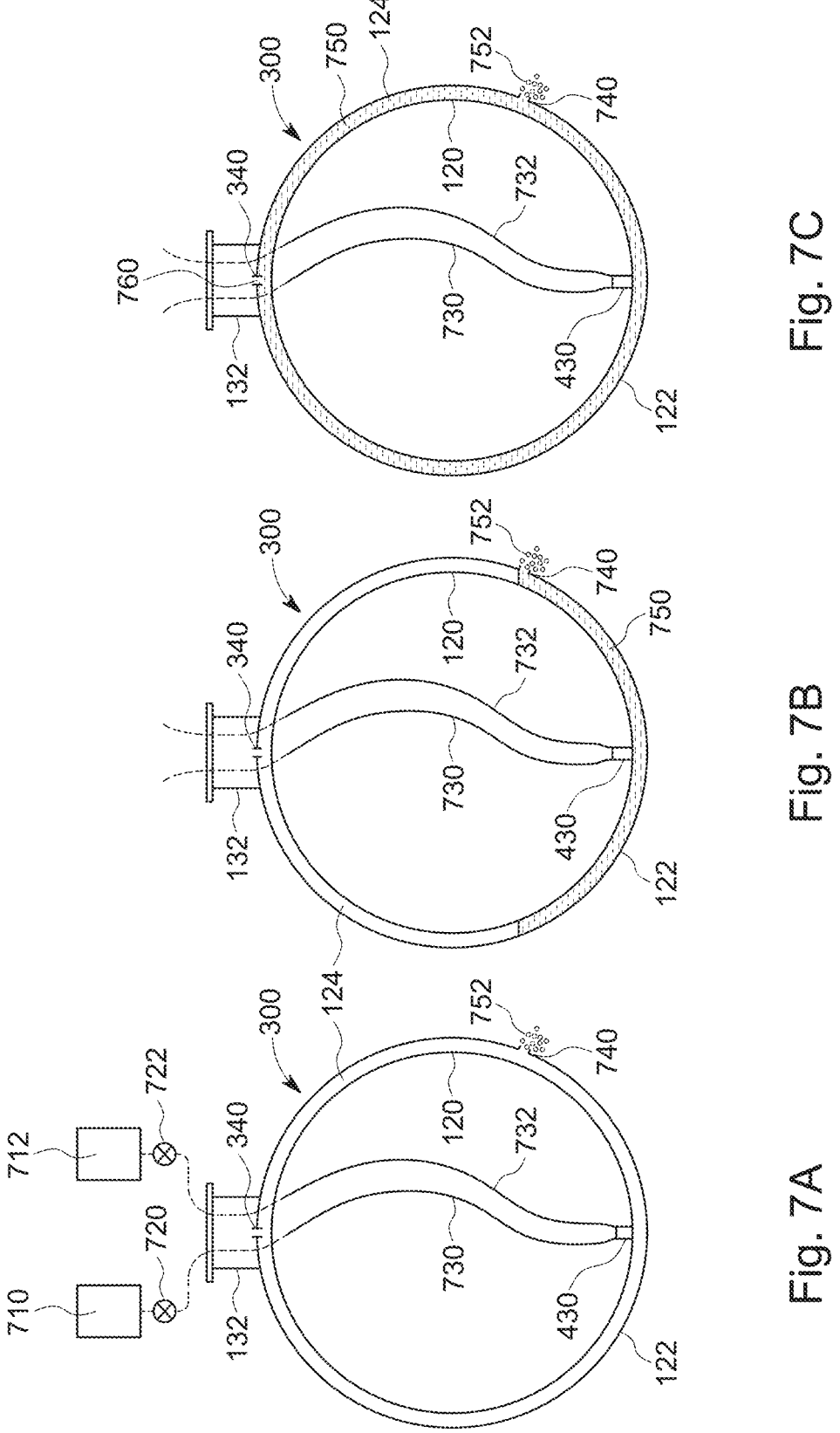
FIGS. 7A-7C are exposed end views respectively showing the steps of filling the interstice of an exemplary tank (e.g.

Reference is now made to FIGS. 7A-7C, which show a side cross-section of an exemplary tank 300 as described above, which has been modified to include at least one injection port 430, with associated mixing assembly (FIG. 5) and a top-mounted relief port 340 (or ports 370 in the case of the 320-degree tank 350 in FIG. 3B), both of which communicate with the interstice 124 between inner and outer tank walls 120, and 122, respectively. The soluble compounds of Component A and Component B solutions are mixed to form a pressurized, flowable solution from separate smaller tanks or drums 710 and 712, each with its own discrete pump 720 and 722, respectively. Hoses 730 and 732 can be passed (as shown in phantom) through any acceptable, top-oriented access opening, such as the manway 132—with its cover removed. The pumps 720, 722 are set to provide a desired/predetermined flow rate to the mixing chamber (520 in FIG. 5) of the injection port assembly 430 that maintains the proper ratio of Component A Solution to Component B solution. Hoses 730 and 732 are, respectively, connected between the pumps 720 and 722 and the mixing chamber (520) of the injection port 430 as shown particularly in FIG. 7A. The two pumps 720, 722 are activated to begin flow of the interstitial fill liquid into the interstice. As shown further in FIG. 7B, as the interstitial fill liquid 750 occupies the interstice 124 (from bottom-up), it eventually reaches the level of any breach 740 in the underground storage tank's exterior wall 122, the interstitial fill liquid 750 flows through the breach 740 and infiltrates/fills the pore space in the backfill 752 surrounding the tank 300, thereby creating a resistance to flow. As further shown in FIG. 7C, the interstice fill liquid 750 continues to rise in the space, filling the interstice 124, until it tops out and flows (760) through the relief port(s) 340 (or 370) (according to Method A in FIGS. 2A, 3A, 3B and 4) or the interstitial access port 260 (according to Method B in FIG. 2B).

Upon complete filling of the interstice 124 (FIG. 7C), the ball valves 530 (FIG. 5) of the injection port assembly 430 are closed, and the relief port(s) 340 or interstitial access port (260) is/are closed/sealed to prevent any introduction of air due to backflow caused by gravity. The interstitial fill liquid 750 then solidifies to form an impermeable barrier approximately (e.g.) 3 to 10 minutes following the onset of interstitial fill liquid injection.

Once the interstitial fill liquid 750 has solidified, the injection port assembly 430 is removed from the flanged coupling nut (510 in FIG. 5), and the flanged coupling nut is covered using fibrous reinforced resinous material, which can be applied to it externally so that it floes onto the adjacent inner wall 120 within the tank's volume.

It should be clear that the above-described system and method provides an effective, straightforward and long-lasting solution to breaches in double-walled underground storage tanks in certain implementations and environments. This system and method avoids the time consuming and costly need to excavate a breached tank, while allowing it to be placed back into service with its useful life to be extended indefinitely.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A method for the repair of breaches in an exterior secondary containment wall of a double wall underground storage tank comprising the steps of:

accessing an interstitial space between the exterior secondary containment wall and an inner primary containment wall with a fluid source input assembly; and injecting a flowable material through the fluid source input assembly that substantially fills the interstitial space of the tank and solidifies to form a substantially impermeable barrier to movement of material through the exterior secondary containment wall and an exterior environment, wherein the steps of accessing and injecting include providing an injection port that defines a passage through the inner primary containment wall for the injection of the flowable material into the interstitial space.

2. The method as set forth in claim 1, wherein the inner primary containment wall is made of metal or a fibrous resinous material.

3. The method as set forth in claim 2, wherein the exterior secondary containment wall is made of metal, a fibrous resinous material, or a polymer material.

4. The method as set forth in claim 3, wherein the exterior secondary containment wall defines a 360-degree secondary containment wall, and further comprising, applying a relief port adjacent to a top of the exterior secondary containment wall to vent the flowable material so as to substantially fully fill the interstitial space.

5. The method as set forth in claim 3, wherein the exterior secondary containment wall defines a 320-degree secondary containment wall, and further comprising, applying relief ports adjacent to locations at a top of the interstitial space, on the exterior secondary containment wall, to vent the flowable material so as to substantially fully fill the interstitial space.

6. The method as set forth in claim 1, wherein the exterior secondary containment wall is made of metal, a fibrous resinous material, or a polymer material.

7. The method as set forth in claim 1, wherein the exterior secondary containment wall defines a 360-degree secondary containment wall, and further comprising, applying a relief port adjacent to a top of the exterior secondary containment wall to vent the flowable material so as to substantially fully fill the interstitial space.

8. The method as set forth in claim 1, wherein the exterior secondary containment wall defines a 320-degree secondary containment wall, and further comprising, applying relief ports adjacent to locations at a top of the interstitial space, on the exterior secondary containment wall, to vent the flowable material so as to substantially fully fill the interstitial space.

9. A method for the repair of breaches in an exterior secondary containment wall of a double wall underground storage tank comprising the steps of:

accessing an interstitial space between the exterior secondary containment wall and an inner primary containment wall with a fluid source input assembly;

injecting a flowable material through the fluid source input assembly that substantially fills the interstitial space of the tank and solidifies to form a substantially impermeable barrier to movement of material through the exterior secondary containment wall and an exterior environment; and directing a first component of the flowable material from a first source along a first hose and a second component of the flowable material from a second source along a second hose both into an interior volume of the underground storage tank to a mixer that is coupled to the injection port.

10. The method as set forth in claim 9, wherein the steps of accessing and injecting include providing an injection port that defines a passage through the inner primary containment wall for the injection of the flowable material into the interstitial space.

11. The method as set forth in claim 9, wherein the step of providing the injection port includes drilling a hole in the inner primary containment wall, and sealably securing a flanged threaded coupling nut into the hole, the flanged threaded coupling being connected to the mixer.

12. The method as set forth in claim 9, wherein the step of directing includes providing the first component consisting of acrylamide grout mix and the second component consisting of acrylamide activation mix.

13. The method as set forth in claim 9, wherein the exterior secondary containment wall defines a 360-degree secondary containment wall, and further comprising, applying a relief port adjacent to a top of the exterior secondary containment wall to vent the flowable material so as to substantially fully fill the interstitial space.

14. The method as set forth in claim 9, wherein the exterior secondary containment wall defines a 320-degree secondary containment wall, and further comprising, applying relief ports adjacent to locations at a top of the interstitial space, on the exterior secondary containment wall, to vent the flowable material so as to substantially fully fill the interstitial space.

* * * * *